(12) United States Patent
Cotter

(10) Patent No.: US 9,929,958 B2
(45) Date of Patent: Mar. 27, 2018

(54) QUALITY OF SERVICE FOR MIXED SERVICE TIERS

(71) Applicant: ARRIS Enterprises, Inc., Suwanee, GA (US)

(72) Inventor: Anthony John Cotter, Cork (IE)

(73) Assignee: ARRIS Enterprises LLC, Suwanee, GA (US)

( * ) Notice: Subject to any disclaimer, the term of this patent is extended or adjusted under 35 U.S.C. 154(b) by 108 days.

(21) Appl. No.: 14/943,319

(22) Filed: Nov. 17, 2015

(65) Prior Publication Data

US 2016/0149815 A1 May 26, 2016

Related U.S. Application Data

(60) Provisional application No. 62/082,719, filed on Nov. 21, 2014.

(51) Int. Cl.
| | |
|---|---|
| *H04L 12/801* | (2013.01) |
| *H04L 12/26* | (2006.01) |
| *H04L 12/825* | (2013.01) |
| *H04L 12/851* | (2013.01) |

(52) U.S. Cl.
CPC .......... *H04L 47/12* (2013.01); *H04L 43/0876* (2013.01); *H04L 47/24* (2013.01); *H04L 47/2425* (2013.01); *H04L 47/25* (2013.01)

(58) Field of Classification Search
CPC ..... H04L 47/12; H04L 43/0876; H04L 47/24; H04L 47/2425; H04L 47/25
See application file for complete search history.

(56) References Cited

U.S. PATENT DOCUMENTS

| | | | |
|---|---|---|---|
| 2003/0026207 A1 | 2/2003 | Loguinov | |
| 2011/0176422 A1* | 7/2011 | Nadas | H04L 23/02 370/235 |
| 2012/0008501 A1* | 1/2012 | Lundh | H04L 12/5695 370/235 |
| 2014/0269314 A1 | 9/2014 | Ozer | |
| 2016/0117180 A1* | 4/2016 | Cardonha | G06F 9/44505 713/100 |
| 2016/0149815 A1* | 5/2016 | Cotter | H04L 43/0876 370/235 |

FOREIGN PATENT DOCUMENTS

| | | |
|---|---|---|
| EP | 1232627 B1 | 7/2009 |
| EP | 2087662 A1 | 8/2009 |
| EP | 2802112 A1 | 11/2014 |

OTHER PUBLICATIONS

PCT Search Report & Written Opinion, RE: Application No. PCT/US2015/061023, dated Feb. 11, 2016.

(Continued)

*Primary Examiner* — Luat Phung
(74) *Attorney, Agent, or Firm* — Lori Anne D. Swanson

(57) ABSTRACT

Improving the quality of service in multiple service tiers, particularly during periods of Internet congestion, may be accomplished by scaling back the bitrate from a maximum rate to a minimum reserved rate in a non-linear fashion. The use of an intermediate value for scaling back enables a quick drop off of high maximum rates. In embodiments, the shape of a non-linear curve may be configured and controlled to make the drop-off steeper for heavy users.

20 Claims, 10 Drawing Sheets

(56) References Cited

OTHER PUBLICATIONS

B. Gaurav, et al., "LIMERIC: A Linear Adaptive Message Rate Algorithm for DSRC Congestion Control", IEEE Transactions on Vehicular Technology, vol. 62, No. 9, Nov. 1, 2013, pp. 4182-4197.
Akyildiz, Ian, et al., "Multi-level Rate-based Flow Control for ABR Traffic", Performance Evaluation: An International Journal, NH Elsevier, Performance Evaluation 31, 1997.
"Real-time Network Management of Internet Congestion", BITAG: Broadband Internet Technical Advisory Group, Oct. 2013.

* cited by examiner

QUALITY OF SERVICE FOR MIXED SERVICE TIERS

CROSS-REFERENCE TO RELATED APPLICATIONS

This application claims the benefit of priority under 35 U.S.C. § 119(e) to U.S. Provisional Application No. 62/082,719 filed on Nov. 21, 2014, the entire disclosures of which is incorporated herein by reference.

BACKGROUND

The Internet is designed to share capacity among multiple users and multiple services. For efficiency, multiple users may dynamically share Internet capacity and multiple services may share the same network links and routers, instead of using dedicated capacity or using separate links and routers. A peak demand of users or services sharing Internet bandwidth may occasionally cause operation at a level that exceeds the available bandwidth or capacity. Congestion management is important for reasonable access and use of the Internet.

A shared Internet connection may consist of multiple service tiers. For example, a typical shared Internet connection may consist of multiple tiers with each tier having a maximum rate between 10 Mbps to 200 Mbps. The goal of quality of service (QoS) is to provide priority including dedicated bandwidth, controlled jitter and latency (required by some real-time and interactive traffic), and improved loss characteristics. Also important is making sure that providing priority for one or more flows does not make other flows fail.

A service flow represents either an upstream or a downstream flow of data. A flow can be defined in a number of ways. One common way refers to a combination of source and destination addresses, source and destination socket numbers, and the session identifier. It can also be defined more broadly as any packet from a certain application or from an incoming interface. Different service flows may accommodate different types of applications. For example, web and email may use one service flow, voice over IP (VoIP) may use another, and Internet gaming may use yet another service flow. In such a scenario, the characteristics of each service flow may be different in order to provide an appropriate type of service for each of these applications.

For a catch-all service flow, which may be addressed by the disclosed techniques, a typical usage includes all traffic destined for a particular modem, sorted into a number of service flows. For example, the service-flows may include high priority service-flow, for management purposes (MAC Management Messages to alter a configuration of service flows, etc). The high priority service-flow may carry insignificant traffic. The service flows may include a number of service flows for specific applications, such as VoIP, gaming, Video on Demand, etc. These flows may be identified based on DSCP markings of packets, source IP address, or any other parameter that a cable operator configures. The service-flows may include the above and any remaining traffic assigned to a High Speed Data service-flow, which is often how most traffic is transmitted between a headend and modem. Further, the above service-flows may all be present for both the upstream direction and separately for the downstream direction.

Distributing bandwidth in an Internet network may include scheduling a plurality of service flows in the upstream and/or the downstream. For example, a DOCSIS-compliant CMTS can provide different upstream scheduling modes for different packet streams or applications through the concept of a service flow. Each service flow is a flow of packets that may conform to a particular QoS and scheduling may be based on the QoS of a service flow. For example, each service flow can have its own quality of service (QoS) parameters, for example, maximum throughput, minimum guaranteed throughput and priority.

During congestion, a typical QoS mechanism is to divide the available bandwidth based on a percentage of the configured maximum rate or configured minimum reserved rate of each service-flow. For example, during severe link congestion, each service-flow may be adjusted to receive 10% of the configured maximum rate for the respective tier. Thus the bandwidth for the lowest service tier service-flows would be set at 1 Mbps whereas the bandwidth for the highest service tier service-flows would be set at 20 Mbps each.

However, a mix of service-flows having high maximum rates and low maximum rates can cause poor QoS for the service-flows with low maximum rates during channel congestion if all rates are scaled back linearly as congestion increases. The conventional solutions for adjusting bandwidth to the multiple services during periods of congestion result in an uneven distribution of bandwidth and the adjustments typically do not correlate well to the costs of services. For example, access to a higher service tier does not typically cost 20 times higher than rate for the lowest service tier. Thus, a 20:1 ratio of bandwidth distribution between the 200 Mbps and 10 Mbps tiers during congestion may be an undesirable consequence. Thus, light users may be at a disadvantage if their bitrate is scaled back linearly from a maximum rate during congestion similarly to heavy users.

Alternate solutions for distributing bandwidth between multiple tiers of service are desirable, particularly during periods of congestion.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

Figure 1:
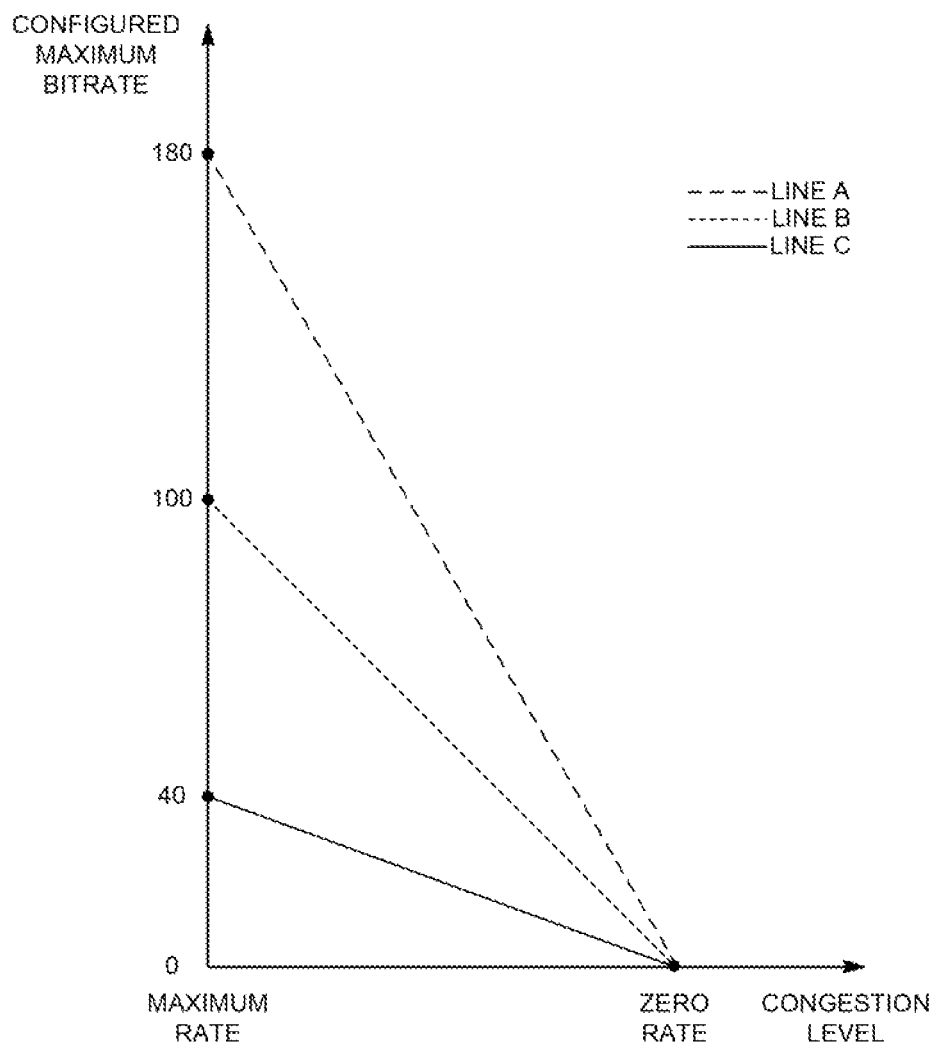
FIG. 1 illustrates an example of linear scaling of bitrates of service-flows based on service-classes

It is noted that while the accompanying FIGS. serve to illustrate embodiments of concepts that include the claimed invention, and explain various principles and advantages of those embodiments, the concepts displayed are not necessary to understand the embodiments of the present invention, as the details depicted in the FIGS. would be readily apparent to those of ordinary skill in the art having the benefit of the description herein.

DETAILED DESCRIPTION

Disclosed herein are techniques for improving quality of service in multiple service tiers, particularly during periods of Internet congestion. Embodiments are described for scaling back bitrate from a maximum rate to a minimum reserved rate in a non-linear fashion so that the high maximum rates can be made to drop off quickly during congestion. As disclosed, the shape of a non-linear curve may be configured and controlled to make the drop-off steeper for heavy users.

Embodiments are disclosed that do not rely on modification of the configuration parameters maximum rate, minimum reserved rate, or priority. Some of these configuration parameters are fixed for workability in the service and a problematic for mixed services if changed. For example, in DOCSIS implementations, changing a priority to impact heavy users during times of congestion may result in starving out or not servicing the lower priority flows when using strict priority queuing in a DOCSIS downstream scheduler. Solutions that penalize heavy users by reducing the throughput for heavy users to prevent starvation of lighter users may rely on the use of lowering the minimum bitrate for the service flow. However, such changes may be problematic for voice services such as VoIP or IP video that may need to use the minimum bitrate configured for the particular service flow. Further, changes to the configuration parameters may be prohibited and even illegal in certain services or in certain countries (e.g., the United Kingdom telecoms regulator does not permit reconfiguration of a maximum rate to penalize heavy users).

The Internet is a general purpose, public computer network which allows millions of computers all over the world, connected to the Internet, to communicate and exchange digital data with other computers also coupled to the Internet. Some of the myriad functions possible over the Internet include sending and receiving electronic mail (e-mail) messages, browsing different web sites, downloading and/or uploading files, etc. In the past, activities over the Internet were limited due to the relatively slow connection speeds of dial-up modems over standard telephone lines. However, as new technologies emerge, the speed at which one can connect onto the Internet is ever increasing. Users on the Internet have the bandwidth to participate in live discussions in chat rooms, play games in real-time, watch streaming video, listen to music, shop and trade on-line, etc. Bandwidth may be distributed such that video-on-demand, HDTV, IP telephony, video teleconferencing, and other types of bandwidth intensive applications are possible for a plurality of users.

Due to traffic congestion, network availability, routing conditions, and other uncontrollable external factors, there is a problem with distributing bandwidth over the network to end users. QoS refers to the ability of a network to provide improved service to selected network traffic over various underlying technologies including Frame Relay, ATM, Ethernet and 802.1 networks, SONET, and IP-routed networks. In particular, QoS features provide improved and more predictable network service by providing the following services: supporting dedicated bandwidth, improving loss characteristics, avoiding and managing network congestion, shaping network traffic, and setting traffic priorities across the network.

FIG. 1 illustrates shows an example of linear scaling of the bitrates of service-flows based on service-classes represented by Line A, Line B, and Line C. The configured maximum bitrate is shown for the three representative service tiers Line A, Line B, and Line C as 180 Mbps, 100 Mbps, and 40 Mbps, respectively. It is noted that the maximum bitrate for a service flow may be defined as the maximum rate at which traffic can operate over this service flow, and is expressed in bits per second.

As illustrated in FIG. 1, as congestion increases (x-axis) the corresponding bitrate for each service Line is reduced from the Maximum Rate at the lowest level of congestion towards a zero rate at an increased level of congestion. Thus, employing a linear scaling technique causes a ratio of bitrates between the service tiers to stay the same because the bitrate of each is scaled linearly towards zero. For example, if congestion increased to 50% of the Maximum Rate, the bitrate for the service tier represented by Line A would be reduced from 180 Mbps to 90 Mbps, the bitrate for the service tier represented by Line B would be reduced from 100 Mbps to 50 Mbps, and the bitrate for the service tier represented by Line C would be reduced from 50 Mbps to 25 Mbps. In this manner, the reduction in services during congestion is based on the concept of fairness and applying the reduction consistently across users across all levels of service.

Figure 2:
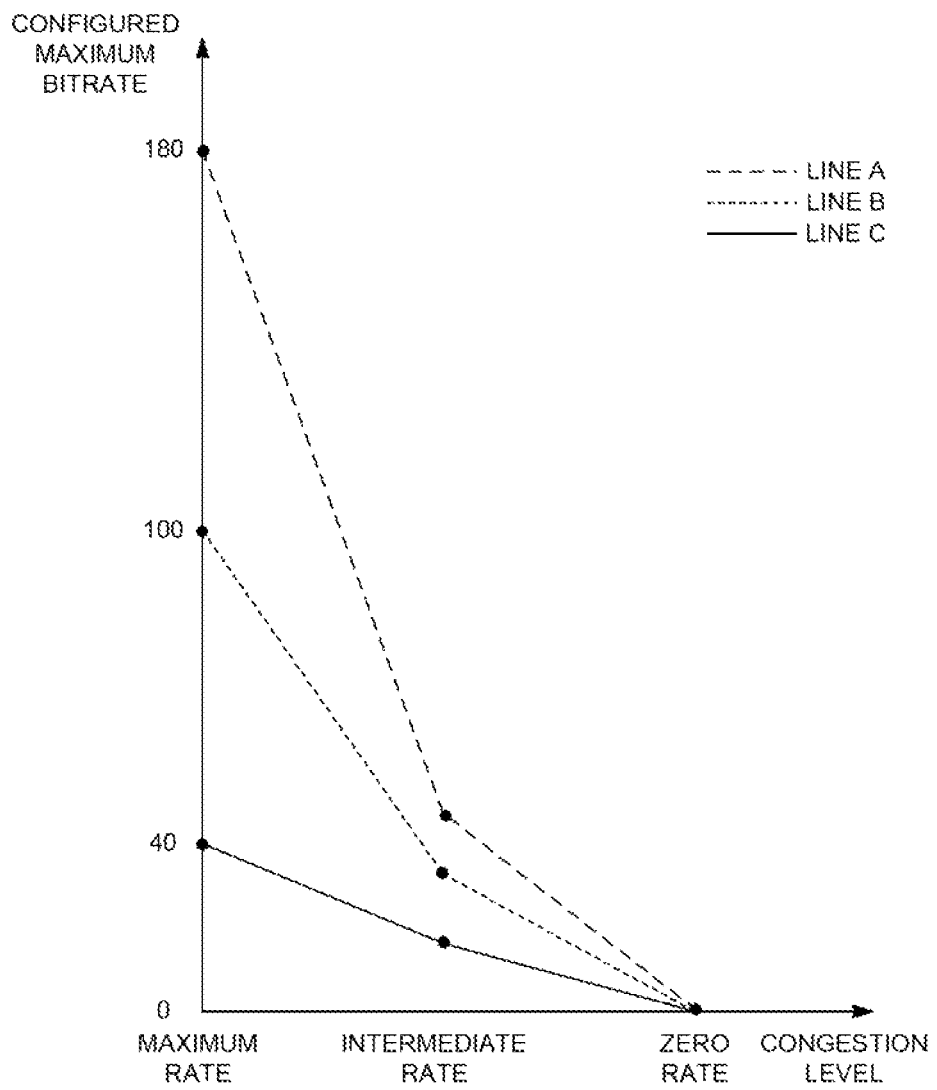
FIG. 2 depicts an embodiment for scaling a bitrate towards an intermediate value instead of towards zero.

In scenarios, light users may utilize Internet bandwidth in bursts, such as when a user is browsing a webpage. In contrast, a heavy user may be accessing an Internet Protocol (IP) service, e.g., Netflix, and steadily consuming a higher amount of bandwidth. For example, a user may consume hours of video at 2-4 Mbits/sec. It may be desirable during period of congestion to manage bandwidth in a manner that does not impair the light user due to the heavy user's activity. FIG. 2 depicts an embodiment of the disclosed techniques that scales the bitrate towards an intermediate value first, which may improve the bandwidth distribution between service classes containing a variety of configured maximum bitrates. As illustrated in FIG. 2, the service-class represented by Line A has the steepest drop from the configured maximum rate towards the intermediate rate whereas the Line B and Line C service-classes have a slower drop in bitrate. Therefore, although the ratio of the maximum bitrates is 9:5:2 on a lightly loaded channel, the ratio changes to about 3:2:1 when that same channel is more heavily congested and passes the intermediate rates. The effect of the ratio reduction is that there is less difference in the bitrates being achieved across all service-classes so the service-class with the lowest maximum bitrate will not end up with too low a bitrate for effective internet usage.

FIG. 2 represents embodiments as disclosed for scaling the bitrate towards another intermediate value first to achieve a better bandwidth distribution between service classes containing a variety of configured maximum bitrates. Thus, rather than scaling the bitrate linearly from the configured maximum bitrate towards zero in response to increasing congestion, the intermediate value is used to improve bandwidth distribution. As shown, moving along the line between the maximum bitrate to the intermediate or minimum bitrate, an operative bitrate at any point along the curve may vary based on a level of congestion. As can be seen in FIG. 2, inserting the intermediate bitrate alters the scaling between the maximum bitrate and the minimum bitrate to cause an increasing reduction in a ratio of the operative bitrates to respective maximum rates between service-flows as the congestion increases.

Similarly, the use of an intermediate value may improve on a distribution of bandwidth that is based solely on the instantaneous demand bit rate, where bitrate is assigned to users based on the demand at any particular time. An example scenario of the instantaneous demand technique includes a heavy user boosting continuously at 4-5 Mbps during period A (i.e., average during period A is 4-5 Mbps) and a light user's activity that only causes bursts of bandwidth to be used during some short time intervals and nothing for most of the time. Thus, a bandwidth assigned based on an instantaneous demand bit rate alone may result in a bandwidth assigned to the light user that is close to zero when measured over a longer time interval, thereby impairing the light user's access to the bandwidth as needed for burst modes. The intermediate value technique may improve upon the bandwidth distribution based on the instantaneous demand technique to enable a light user the access to bandwidth for bursting, despite having an average use that is close to zero, and potentially providing the light user with 100% of their desired usage. Specifically, techniques disclosed herein may include increasing the intermediate rate for light users and/or reducing the intermediate rate for heavy users based on their average bit rate over a longer time interval.

Figure 3:
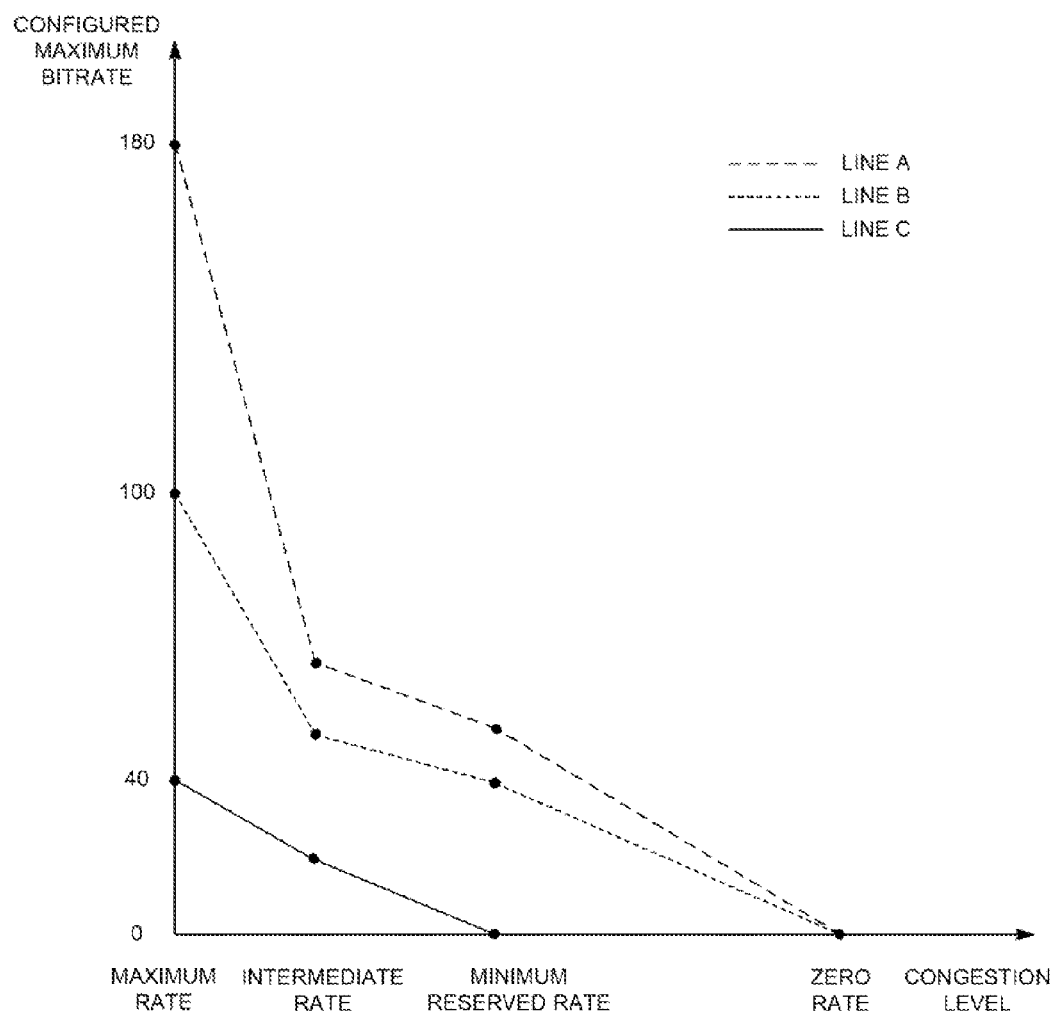
FIG. 3 illustrates embodiments for altering bit rate scaling from maximum rate to minimum reserved rate by inserting an intermediate rate.

FIG. 3 depicts another embodiment related to minimum reserved rate, where each service-flow represented by Lines A, B, and C is configured with both a maximum rate and a minimum reserved rate. It is noted that the minimum reserved rate may be a parameter that indicates a minimum guaranteed throughput in bits per second for the service flow. The combined minimum reserved rates for all service flows on a channel must not exceed the available bandwidth on that channel. Otherwise it is impossible to guarantee the promised minimum reserved rates. It is also noted that in certain scenarios, it is not preferable to modify the minimum reserved rate. For example, a CMTS may not allow new minimum reserved rate service flows to be established if they would cause the upstream port to exceed the configured max-reservation-limit percentage of the available upstream channel bandwidth.

In embodiments, this configuration may require that all service-flows get their minimum reserved rate before any service-flow gets more than their minimum reserved rate. As disclosed herein, an intermediate rate may also be configured for each service class (unique set of configuration parameters, maximum rate and minimum reserved rate) and thus each service-flow belonging to that service-class would use that intermediate rate.

FIG. 3 illustrates embodiments for altering the scaling from maximum rate to minimum reserved rate by inserting an intermediate rate, as also described above. FIG. 3 illustrates a maximum rate (the configured maximum bit rate for each service tier, i.e., Line), a minimum reserve bit rate for each service-flow, an intermediate value for each service-flow, and the zero rate. In embodiments, the maximum rate and minimum reserve rate are fixed rates that cannot be adjusted. In embodiments disclosed, the scaling that takes place between maximum rate and the minimum reserve rate for each service tier is adjusted based on a configured intermediate rate, particularly during periods of congestion.

A service flow has a maximum bitrate, a minimum reserved rate and a zero bitrate. The maximum bitrate and minimum reserved rate are set individually for each service flow, but those settings may come from a service class configuration. Thus, the settings for the maximum and minimum reserved rates may be identical for multiple service flows.

The minimum reserved rate is often zero (same as zero bitrate) except for VoIP. However, it should be understood that the zero rate is a number that the bitrate scales towards, but is preferably not reached, as the zero bitrate represents a scenario in which a service flow receives no service. For example, the service flow may have no configured minimum reserved rate and all other service flows of the same priority are getting less than their minimum reserved rate. The service flow may have a low priority and all available bandwidth is being consumed by service flows of higher priority. If all flows have the same priority and the minimum reserved rate of all is the same, then the only way that the zero rate would apply to a service flow is if there were an infinite number of service flows getting an insignificant bitrate each.

In the example shown in FIG. 3, the intermediate rate is a value between the maximum rate and the minimum reserved rate. If scaling was linear-based, the scaling would be represented by a straight line (as shown in FIG. 1). However, by inserting the intermediate rate configured individually for each service class, the slope is non-linear. In this example, the initial slope as congestion increases is much steeper for Line A, causing the bit rate to drop much faster for service flows using Line A. In contrast, the intermediate value configured for Line C causes almost no difference from a linear scaling.

Instead of a linear drop based on scaling towards a minimum reserved rate, the scaling of the bit rate may result in a curve based on the insertion of the intermediate rate. In the example shown in FIG. 3, the minimum reserve rate for Line A is 60 Mbps. A 50% linear drop for Line A based on the maximum bitrate and the minimum reserve rate would be =minimum reserved rate (60 Mbps)+(maximum rate (180 Mbps)−minimum reserved rate (60 Mbps))*50%=120 Mbps). In contrast, an intermediate value at the same point in between maximum rate and the minimum reserved rate is 65 Mbps. Thus, instead of dropping to 120 Mbps, in this example the intermediate rate technique causes a much steeper drop in bit rate for service flows on Line A. It is noted that in embodiments the intermediate rate may be configured to scale back the bit rate during periods of congestion in a manner that causes a greater scaling back or reduction in the bit rate than the linear scale back reduction. In embodiments the intermediate rate may be configured to scale back the bit rate during periods of congestion in a manner that causes a lesser scaling back in the bit rate than the linear scale back reduction.

In embodiments, a general rule is imposed which allows the intermediate value to be calculated based on maximum rate and minimum reserved rate. For example, the rule may be that an intermediate rate of 5 Mbps is used for a 10 Mbps maximum rate and it increases by 3 Mbps for each doubling of the maximum rate beyond that. Thus the corresponding values would be as follows:

| Maximum rate | Intermediate rate |
|---|---|
| 10 | 5 |
| 20 | 8 |
| 40 | 11 |
| 80 | 14 |
| 160 | 17 |

It should be understood that any other rule imposed to cause a reduction of the ratio of intermediate rate to maximum rate as the maximum rate increased would also be applicable to automatic configuration.

In examples where service-flows having a minimum reserved rate, the above example rule would apply to the bitrate above minimum reserved rate. In other words, the minimum reserved rate would be subtracted from the Maximum rate first and the intermediate rates would be calculated based on the reduced maximum rate. Finally, the minimum reserved rate would be added to the calculated intermediate rate as in the following example;

| Maximum rate | Minimum reserved rate | Intermediate rate |
|---|---|---|
| 12 | 2 | 2 + 5 = 7 |
| 25 | 5 | 5 + 8 = 13 |
| 45 | 5 | 5 + 11 = 16 |
| 90 | 10 | 10 + 14 = 24 |
| 170 | 10 | 10 + 17 = 27 |

Network operators may continuously collect measurements on the links and routers in their networks. Due to a large volume of packets passing through a link or router, network operators may aggregate measurements. For instance, rather than recording the instantaneous demand of a user of Internet bandwidth every millisecond, a network operator may calculate and record the percentile demand over a period called a measurement interval.

The embodiments disclosed herein may protect light users, e.g., light demand over the measurement interval, from heavy users e.g., a higher demand over the measurement interval. A typical heavy user will have a high average bitrate when measured over an interval of one or more minutes. The length of the measurement interval may significantly affects the resulting indicator of congestion and can be used to effect an alteration in the intermediate rate. The idea is that the curve between the max-sustained rate and min-reserved rate will be pushed further from the linear line depending on how high the average bitrate is and for how long it has been high. If curve is far from the linear line, it means that the flow bitrate will drop sharply at the onset of congestion but level off as congestion worsens. A linear curve means that the flow bitrate will drop linearly as congestion increases.

The intermediate value (used to approximate the shape of a curve) could be set to one of a few discrete values via external configuration (e.g., PCMM) based on utilizations which are read from the CMTS (via CLI or MIBs). The intermediate value (used to approximate the shape of a curve) could be varied automatically from a maximum value towards a minimum value based on a measured utilization over a configured interval of say 1 to 15 minutes. For example, during congestion, an external policy server may modify the intermediate rate of Heavy Users. The external policy server may read the bytes passed for each service-flow periodically to determine the average bitrate and could adjust the intermediate rate of heavy users when necessary.

If an intermediate rate via PCMM is not ideal, the feature may be implemented by setting the service-flow DOCSIS priority field via PCMM and associating that priority with an internal intermediate rate via a separate configuration.

The disclosed techniques may overcome throttling of heavy users based on reconfiguring either the max-sustained rate, min-reserved rate, or the priority of a service flow. Rather, the max-sustained rate, min-reserved rate, or the priority of a service flow may remain unaltered. Further, instead of relying on configuration changes, the disclosed techniques do not require activating or deactivating but instead may occur in response to periods of detected congestion.

In embodiments, once all service-flows have been reduced to their minimum reserved rate, behavior reverts to typical behavior of reducing the bitrate linearly from the minimum reserved rate towards zero. Thus, embodiments are described that deviate from the conventional technique of dividing the bitrate based on ratios of minimum reserved rate or to scale the bitrate linearly from maximum rate to minimum reserved rate first and then from min-reserved rate to zero.

In embodiments, the per-service-flow max-sustained rate, min-reserved rate and priority may not be modified due to potential interference with other QoS features. As disclosed, an edge router bandwidth fairness of scaling all service-flow bitrates linearly from their max-sustained rate towards their min-reserved rate during congestion can be modified so that the scaling is non-linear instead. Non-linear scaling may be best represented as a curve which starts at max-sustained rate and ends at min-reserved rate but follows a non-linear path in-between. The simplest representation of this non-linear scaling is to add a third point (intermediate value) to form 2 sides of a triangle rather than a smooth curve. Scaling the bitrate towards intermediate values can achieve a better bandwidth distribution between service classes containing a variety of configured maximum bitrates.

In the case of using minimum reserved rate, scaling from maximum rate to minimum reserved rate by inserting the intermediate rate can achieve a better bandwidth distribution. However, once all service-flows have been reduced to their minimum reserved rate, behavior reverts to typical behavior of reducing the bitrate linearly from the minimum reserved rate towards zero. As disclosed herein, the algorithm for scaling back bitrate may be configured using an intermediate rate configured for each service class. A general rule may be configured to allow the intermediate value to be calculated based on maximum rate and minimum reserved rate.

In embodiments, the intermediate bitrate is configured indirectly by associating a DOCSIS priority with an intermediate bitrate percentage so that configuring the priority of a service-flow via a Power of PacketCable Multimedia (PCMM) may have the same effect as configuring the intermediate rate of a service-flow.

It is noted that the disclosed embodiments may improve approaches of distributing bandwidth based on a configured ratio of a total bandwidth for a queue, which is referred to as weighted fair-queuing, a scheme which does not allow prediction of bandwidth on an individual service-flow in each band b/c it depends on how many service-flows that share the queue. In contrast, embodiments of this disclosure include supporting identical grouping of service-flows and the same changes in priority of heavy users via a policy server, but in a different manner, and can be used to improve a weighted fair-queuing approach.

Figure 4:
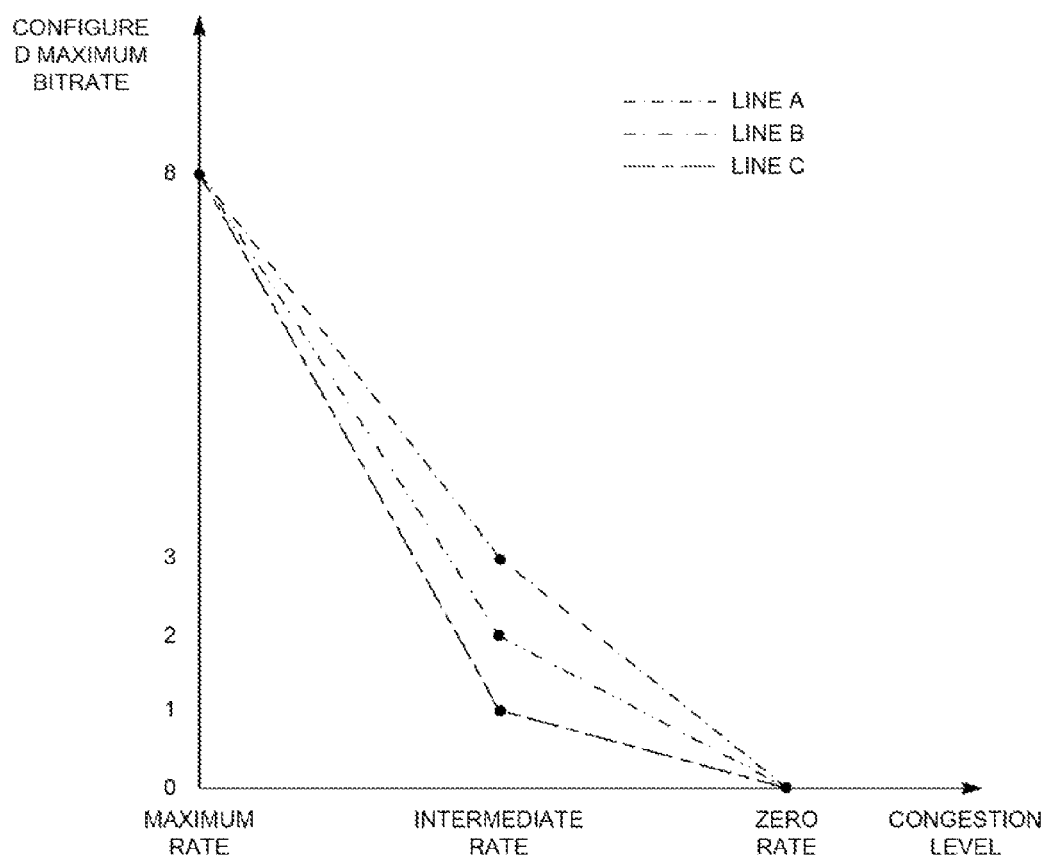
FIG. 4 depicts the varying paths for example service calls between the maximum rate and the minimum rate.

FIG. 4 depicts an example in which Line A corresponds to a light user and this gets a high intermediate rate of 3 Mbps. A service-flow with a higher measured utilization would be forced to Line B (2 Mbps intermediate rate) and a very heavy user would be forced to Line C (1 Mbps intermediate rate). In all cases the maximum rate and the minimum rate (zero in this example) are identical and only the path between them changes. A typical current solution is to change the maximum rate, minimum reserved rate or priority, based on measured utilization, in order to reduce the bitrate of heavy users.

The effect of a service-flow following Line C is that for a given level of congestion, that service-flow would be getting a lower bitrate than a service-flow following Line A. Thus, moving along the line between the maximum bitrate to the intermediate or minimum bitrate, an operative bitrate at any point along the curve may vary based on a level of congestion. As can be seen in FIG. 4, inserting the intermediate bitrate alters the scaling between the maximum bitrate and the minimum bitrate to cause an increasing reduction in a ratio of the operative bitrates to respective maximum rates between service-flows as the congestion increases.

In embodiments, the intermediate value could be set to one of a few discrete values via external configuration (e.g., PCMM) based on utilizations which are read from the CMTS (via CLI or MIBs). In embodiments, the intermediate value could be varied automatically from a maximum value towards a minimum value based on a measured utilization over a configured interval of say 1 to 15 minutes.

Although the previous examples are simplified and use an intermediate rate to form a non-straight path between the maximum rate and the minimum reserved rate, the more general case is a smooth curve where the magnitude of the curve can be varied. This is more complicated to realize in an implementation but can be done using a mathematical representation for the curve. This may be a quadratic equation, a Bezier curve or any mathematical expression which forms the appropriate shapes as shown in FIG. 5.

Figure 5:
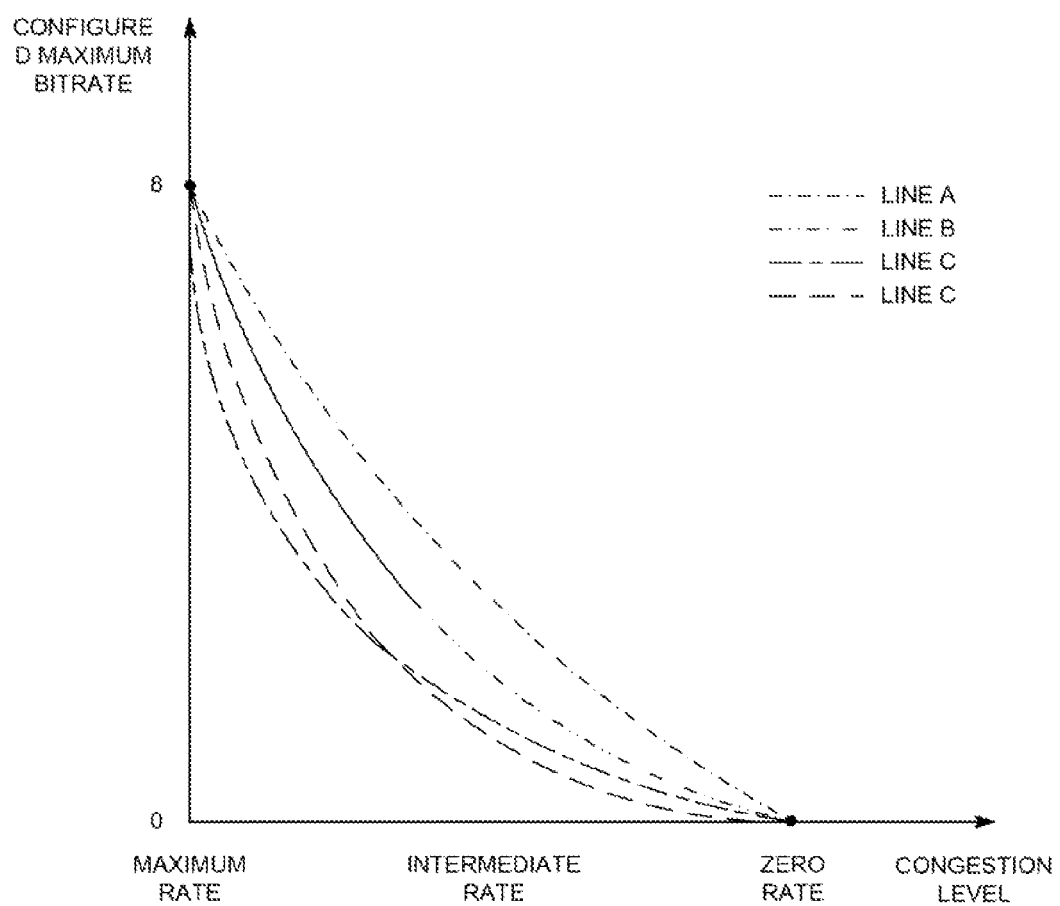
FIG. 5 illustrates the shape of a bit rate scaling curve configured so the initial rate of decline may be increased or decreased for a similar average deviation.

FIG. 5 illustrates the embodiment(s) whereby the shape of the curve may be configured so that the initial rate of decline may be increased or decreased for a similar average deviation from a straight line implementation as shown Line C and Line D curves.

As illustrated by FIG. 5, Line A represents a scaling that is close to linear, but Lines B and C represent a scaling that causes a larger curve. The curve is created based on the configuration of the intermediate value, which may vary how much a heavy user vs. light user is impacted during periods of congestion. Thus, by defining a curve for scaling based on the intermediate value, the manner for scaling may be configured differently between service classes and may define various points along the line differently than that of a basic linear scaling for reducing the bit rate.

FIGS. 4 and 5 also illustrates embodiments whereby, in contrast to manually controlling a minimum reserve rate, the disclosed techniques may omit the use of a minimum reserve rate or set the minimum reserve rate to the zero rate in order to create the curve for scaling. In implementations for voice services, for example, the use of a minimum reserved rate creates problems. For example, for voice services the CMTS may add the total amount of minimum reserved rate admitted and reject voice services which cause the total to exceed a configured percentage of the channel capacity. In embodiments, multiple intermediate points are used to create the curve for bit rate scaling.

Figure 6:
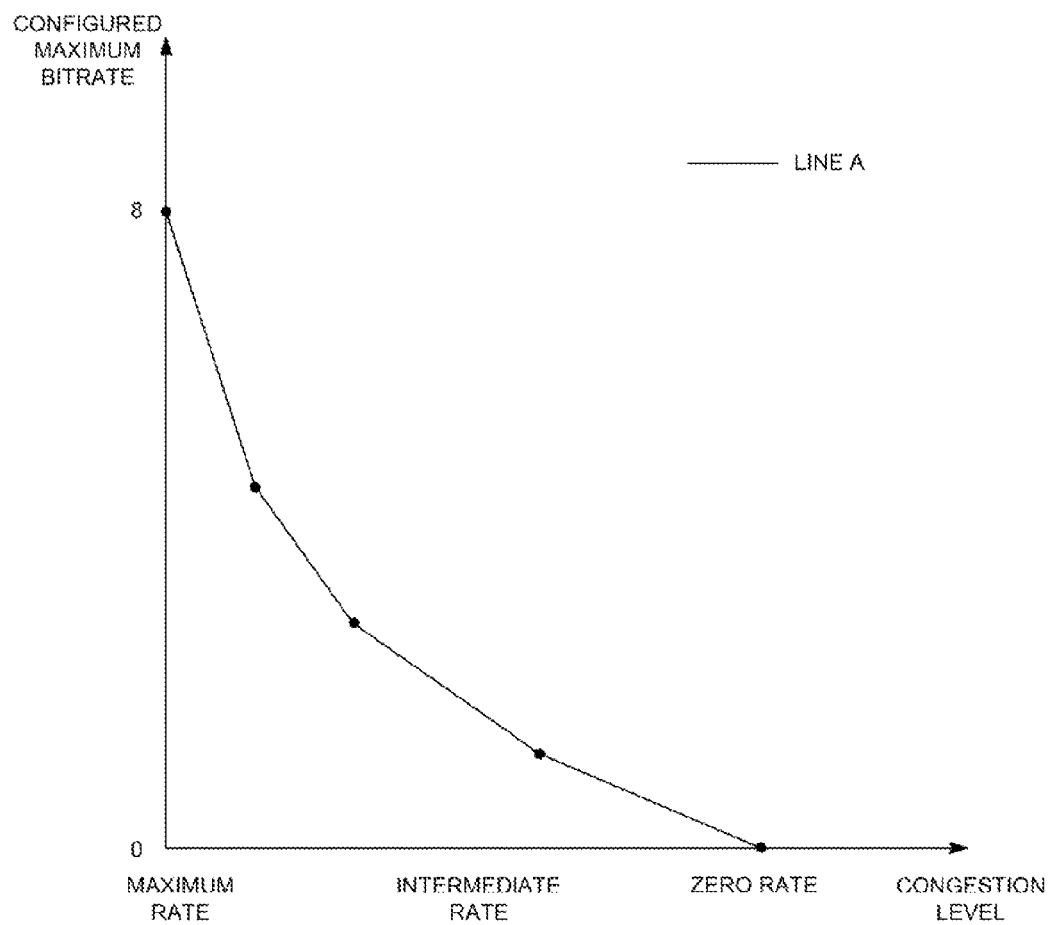
FIG. 6 illustrates an approximation to the curves in FIG. 5 using a single intermediate rate or using multiple intermediate rates.

FIG. 6 illustrates the embodiment(s) whereby an approximation to the curves in FIG. 5 may be made using the single intermediate rate of the earlier examples or using multiple points which are joined up with line segments as shown next.

Embodiments disclosed herein may enable efficient and easy-to implement congestion control algorithms that can adjust multi-tier service rates and heavy user rates during severe congestion. Consider a need for a congestion control approach without using a reduced QoS level approach. Using the disclosed techniques, the service provider may penalize heavy users without reconfiguring the min-reserved rate, the max-sustained rate or priority (all of which have consequences). The simplest implementation can work without need for external monitoring or management of heavy users.

Further, service providers may want to use high max-sustained rates without having a detrimental effect on service-flows with low max-sustained rates. This allows the high max-sustained rates to be lowered quickly at the onset of congestion to give a lower ratio than the ratio of max-sustained rates between different service tiers.

Further, in contrast to bandwidth distribution solutions that require an external server to measure bitrates, evaluate the average, and change priorities of users periodically for purposes of distributing bandwidth amongst the users, the disclosed embodiments may be accomplished without requiring an external server for the additional processing required for such measurements. Further, embodiments of the disclosed intermediate value technique provides continued service to users without stopping services, unlike solutions that involve putting heavy users in a penalty box after a particular period of high usage, after which the heavy user can only be moved out of the penalty box if their bit rate reduces, i.e., the heavy user may get poor service for periods of time. For example, the heavy user may still get service while in the penalty box, but the service may be at a much reduced bitrate depending on how many other heavy users are in the penalty box and on how much bandwidth the light users are using cumulatively. Stopping services or providing no service to certain users may not be acceptable in some industries. Further, reducing a configured max bit rate for a user may not be allowed if a user is paying for a certain bit rate, e.g., some regulatory bodies have banned such practice, requiring that the user have access to the bit rate for which they pay.

It is noted that the disclosed techniques may vary the rate based on congestion control using fairness/utilization criteria that allow non-linear scaling of allowed bitrate using a non-zero min-reserved rate to achieve the non-linear effect. The disclosed techniques enable a modification to the scaling curve without modifying the minimum reserved rate. The disclosed techniques, therefore, include embodiments that enable service providers to control congestion cases without violating net neutrality relegated regulations. For a service provider that wants to avoid flagging heavy users to reduce congestion enough to prevent starvation of lower priority flows, the disclosed techniques offer such a solution. Further, the disclosed techniques may be implemented without basing the scaling on priority (used instead of or in addition to). By scaling the bitrate non-linearly between maximum sustained rate and minimum reserved rate via a mid-point called intermediate rate, the intermediate rate may be modified without changing other configuration parameters, and may be set based on average bitrate over an hour or via external configuration if such a parameter was added.

Further, in contrast to the disclosed techniques, simply reducing the minimum reserved rate may be problematic for service providers that will need to utilize the minimum reserved rate for other services, such as VoIP. Thus, if the minimum reserved rate is needed for another service such as VoIP or IP video, simply modifying the minimum reserved rate for heavy users by reducing it below (maximum rate)/2 is not a long term solution. In contrast to an approach of QoS degradation during congestion, embodiments disclosed select different rate decrease factors for different service tiers. Embodiments also are described herein that solve the issues related to heavy users in the same service, by adjusting their rate decrease factor as well. The main distinction compared to fairness/utilization based rate control algorithms is to adjust the "rate decrease factor" not the service tiers' min/max rate values or QoS levels. From this point of view, the algorithm is easier to implement and is effective to adjust final rates.

The disclosed techniques also may function more efficiently for any data services that distribute bandwidth based on a maximum bit rate where the bitrate of all users is linearly scaled back from a max bit rate to a minimum reserve rate, e.g., at 50% max normal behavior bit rate. In contrast, the disclosed techniques may cause a heavy user's bit rate to scale back in an amount greater than that of a light user, e.g., scaling the heavy user's bit rate back to 25% of the maximum reserve rate. In this manner, the heavy user's bandwidth will drop much faster compared to the scaling back of the bit rate of a light user.

The disclosed techniques also provide a manner for changing the ratio of maximum rate between service tiers to avoid starving lowest service tier users during heavy congestion. Thus, the disclosed techniques may address the scenario in which heavy users within a service tier may be using their bandwidth entitlement continually and consuming so much of the bandwidth that light users cannot get sufficient bandwidth during their short bursts. Instead of using the same instantaneous bitrate as heavy users, light users may use higher bitrates so that their average bitrate comes closer to that of heavy users. As shown herein, moving along the line between the maximum bitrate to the intermediate or minimum bitrate, an operative bitrate at any point along the curve may vary based on a level of congestion.

Figure 7:
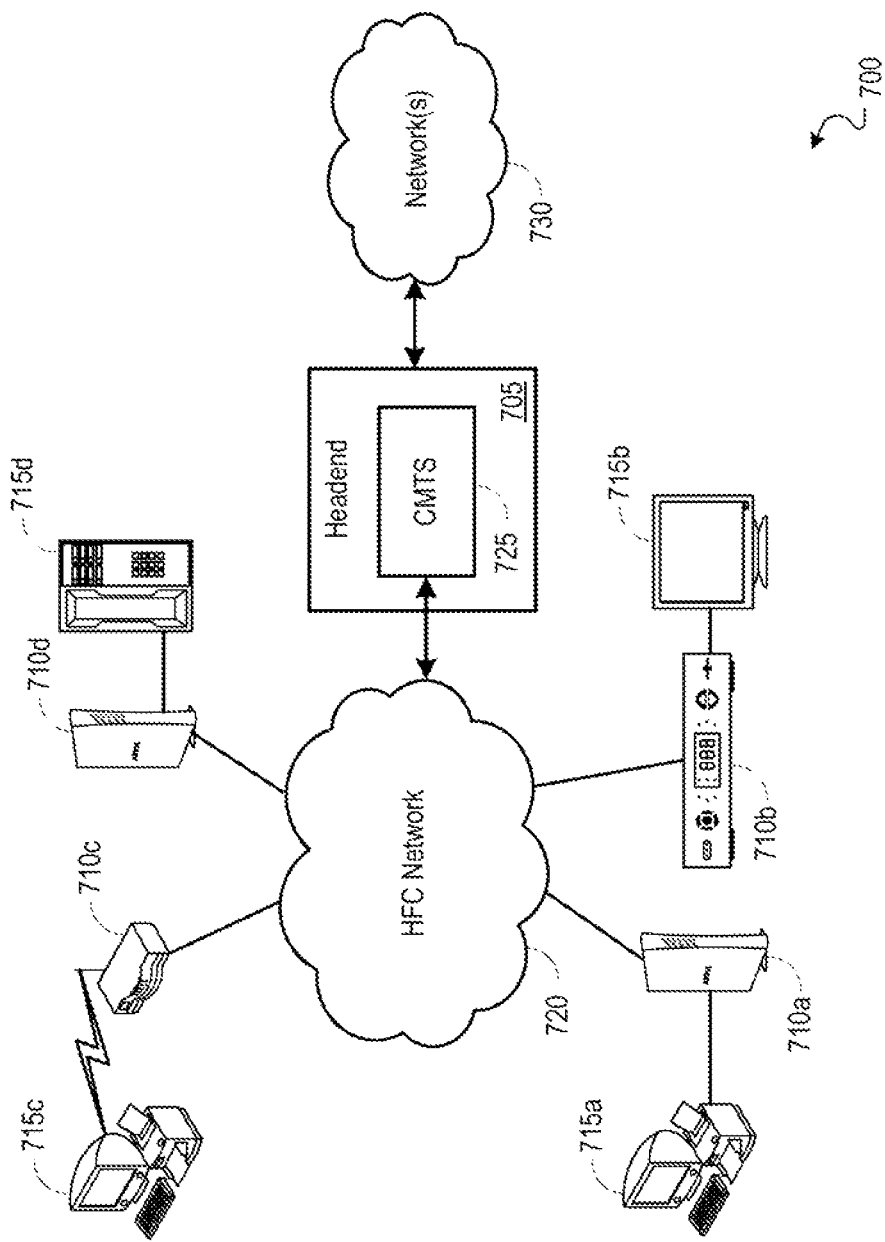
FIG. 7 is a block diagram illustrating an example network environment operable to perform the disclosed scaling techniques.

FIG. 7 is a block diagram illustrating an example network environment 700 operable to implement the disclosed techniques for distributing bandwidth in a network, such as the Internet. In embodiments, an access point 705 can provide video service(s), voice service(s) and/or data service(s) to customer premise equipment (CPE) devices 710*a-d* in one or more subscriber groups (e.g., service group(s)). The CPE devices can include, for example, a cable modem 710*a*, a set-top box 710*b*, a wireless router including an embedded cable modem 710*c*, or a media terminal adapter (MTA) 710*d*, among many others (e.g., digital subscriber line (DSL) modem, voice over internet protocol (VOIP) terminal adapter, video game console, digital versatile disc (DVD) player, communications device, tablet, multimedia over coaxial alliance (MoCA) node, etc.). The CPE devices can facilitate communications between the access point 705 and client devices 715*a-e*. A cable modem or embedded MTA (eMTA) 710*a* can facilitate communications from the headend 705 to a computer 715*a*. A set-top box 710*b* can facilitate communications from the headend 705 to a television 715*b* or a digital video recorder (DVR). A wireless router 710*c* can facilitate wireless communications between a computer 715*c* and a headend 705. An MTA 710*d* can facilitate communications between a telephone 715*d* and a headend 705. In embodiments, an access point 705 can provide video service(s), voice service(s) and/or data service(s) to a mobile device 715*e* and/or other wireless devices.

The CPE devices 710*a-d* and the mobile device 715*e* can communicate with the access point 705 via a subscriber network 720. In embodiments, the subscriber network 720 can be a network that facilitates channel bonding (e.g., data over cable service interface specification (DOCSIS), MoCA, wireless networks including 4G and long term evolution (LTE), etc.). Channel bonding can be the combining of multiple channels into a single channel, or logical channel. In embodiments, the subscriber network 720 can include coaxial cable using multiple channels at different frequencies, optical fiber using multiple channels at different wavelengths, twisted pairs using multiple channels at different frequencies, air using multiple channels at different frequencies, and others.

The access point 705 can facilitate communications between one or more network(s) 725 and the CPE devices 710*a-d* and mobile device 715*e*. In embodiments, the network(s) 725 can include one or more networks internal to the headend and/or one or more networks external to the headend (e.g., one or more extranets, the Internet, etc.). The network(s) 725, for example, can operate using internet protocol (IP), sending data packets to and receiving data packets from the access point 705. In further examples, one or more video sources may provide streaming data through the network(s) 725 to the access point 705. For example, the access point 705 can receive a variety of service flows from the network(s) 725.

In embodiments, the access point 705 can separate service flows into various channels (e.g., streams or links) to be transmitted (e.g., broadcast, multicast, unicast, etc.) to the CPE devices 710*a-d* and/or mobile device 715*e*. For example, each of the various channels can represent a specific bandwidth associated with a medium for transmission (e.g., wireless frequency, DOCSIS channels, optical fiber channels, etc.) of one or more service flows. In embodiments, the access point 705 can separate service flows into one or more logical links (e.g., a specific bandwidth comprising a plurality of links).

In embodiments, the bandwidth of a channel can be made up of contributions from one or more service flows and each service flow can contribute to the bandwidth of one or more channels. In embodiments, a more balanced and more efficient transmission of packets across one or more of a plurality of channels can be achieved using the disclosed techniques. In embodiments, the bandwidth which is used by a service flow during an interval can be allocated to any of the channels which the service flow is using during the interval.

Figure 8:
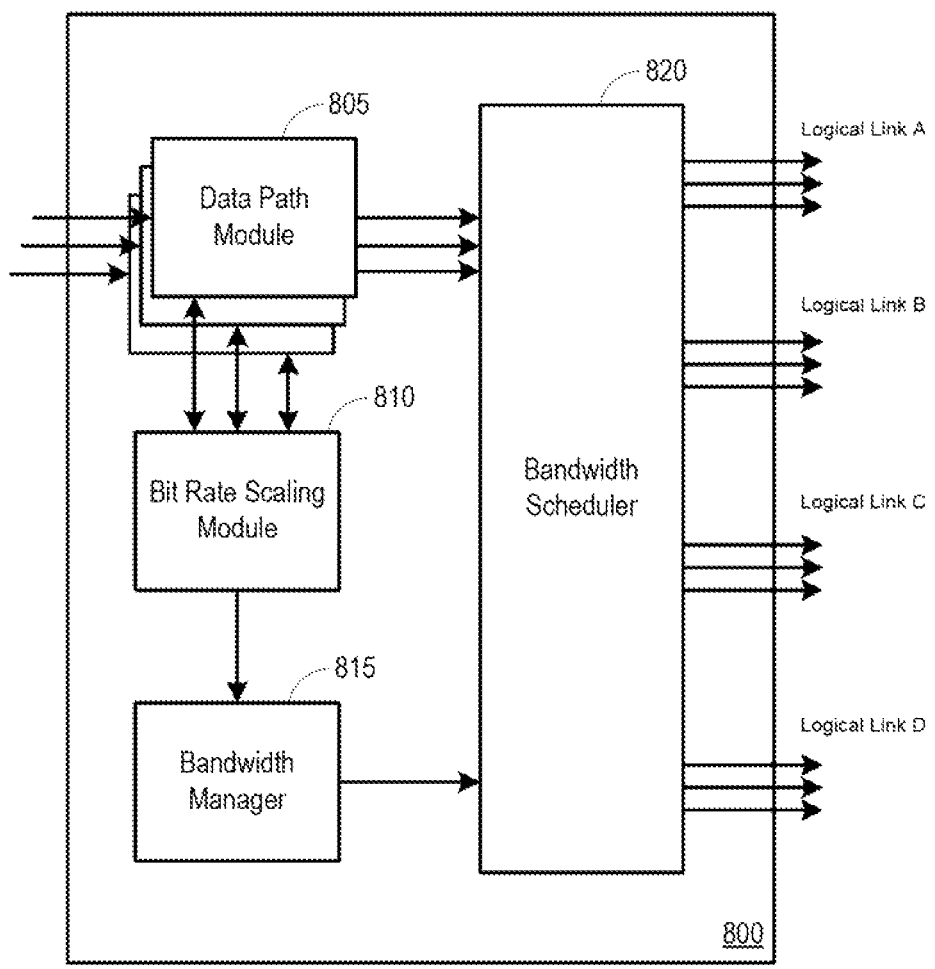
FIG. 8 is a block diagram illustrating an example CMTS operable to perform the disclosed scaling techniques.

FIG. 8 is a block diagram illustrating an example component 800 operable to distribute bandwidth among channels. The component 800 can include a data path module 805, a bit rate scaling module 810, a bandwidth manager 815, and a bandwidth scheduler 815. In embodiments, the component 800 can be located at or within an access point (e.g., access point 705 of FIG. 7).

In embodiments, one or more service flows can be received by the component 800 and can pass through a data path module 805. The data path module 805 can be operable to count the number of bytes associated with each of the one or more service flows. The one or more service flows can be passed from the data path module 205 to a bandwidth scheduler 820.

In embodiments, the data path module provides the service flow information to a bit rate scaling module 810. The bit rate scaling module calculates the modifications to be made to bit rates among the service flows as congestion increases, as disclosed herein. In embodiments, a bandwidth potential manager 815 can calculate a maximum bandwidth potential of one or more channels. The bandwidth potential manager 815 can determine an average bitrate for each service flow by dividing the number of bytes associated with the service flow by a period of time covered by the predetermined interval. In embodiments, the bandwidth potential manager 815 can calculate the maximum bandwidth potential of a channel by summing together the average bitrates of each of the service flows that send packets on the channel.

In embodiments, a bandwidth scheduler 820 can configure service flows to use one or more individual channels (e.g., Channels A-F) or logical channels based upon the maximum and/or minimum bandwidth potentials of the channels. The bandwidth scheduler 820 will schedule service flows over the channels based on the bit rate allocated to each service call by the bit rate scaling module 810. During times of congestion, the bit rates allocated may vary.

Figure 9:
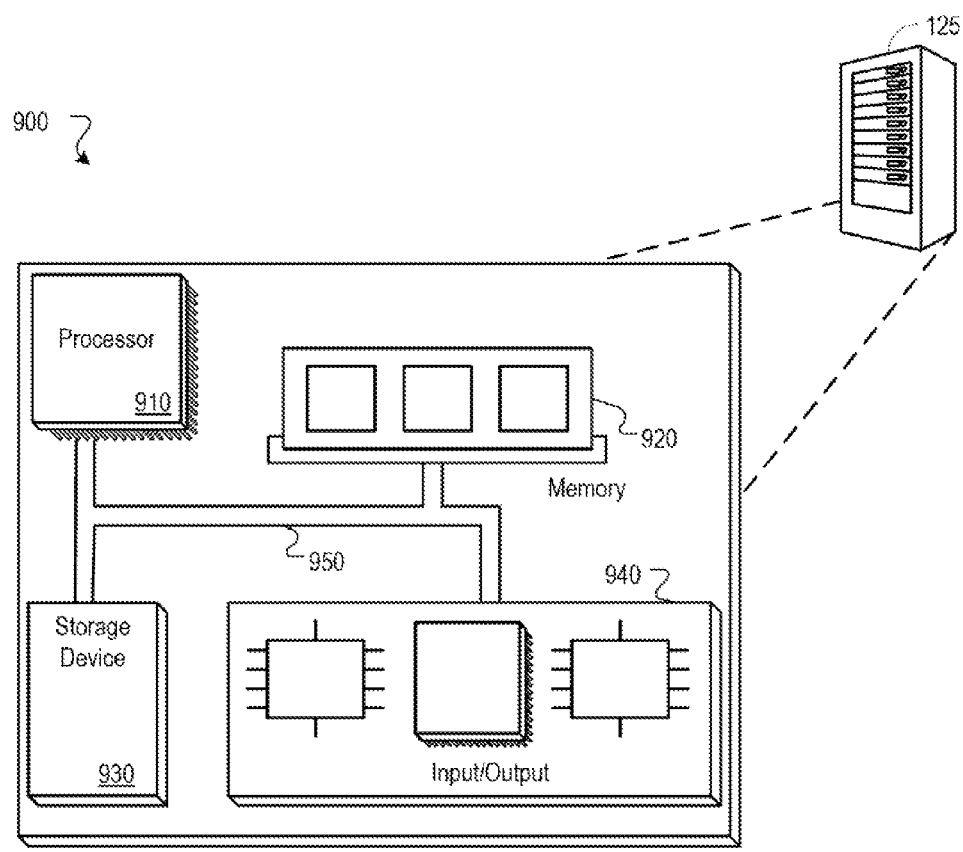
FIG. 9 is a block diagram of a hardware configuration operable to perform the disclosed scaling techniques.

FIG. 9 is a block diagram of a hardware configuration 900 operable to perform scaling as disclosed herein for bandwidth distribution among service calls. It should be understood that the hardware configuration 900 can exist in various types of devices. The hardware configuration 900 can include a processor 910, a memory 920, a storage device 930, and an input/output device 940. Each of the components 910, 920, 930, and 940 can, for example, be interconnected using a system bus 950. The processor 910 can be capable of processing instructions for execution within the hardware configuration 900. In one implementation, the processor 910 can be a single-threaded processor. In another implementation, the processor 910 can be a multi-threaded processor. The processor 910 can be capable of processing instructions stored in the memory 920 or on the storage device 930.

The memory 920 can store information within the hardware configuration 900. In one implementation, the memory 920 can be a computer-readable medium. In one implementation, the memory 920 can be a volatile memory unit. In another implementation, the memory 920 can be a non-volatile memory unit.

In some implementations, the storage device 930 can be capable of providing mass storage for the hardware configuration 900. In one implementation, the storage device 930 can be a computer-readable medium. In various different implementations, the storage device 930 can, for example, include a hard disk device, an optical disk device, flash memory or some other large capacity storage device. In other implementations, the storage device 930 can be a device external to the hardware configuration 900.

The input/output device 940 provides input/output operations for the hardware configuration 900. In one implementation, the input/output device 940 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to send communications to, and receive communications from one or more networks (e.g., subscriber network 120 of FIG. 1, network(s) 125 of FIG. 1, etc.).

In one or more examples, the functions disclosed herein may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses. Various components, modules, or units are described in this disclosure to emphasize functional aspects of components configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Figure 10:
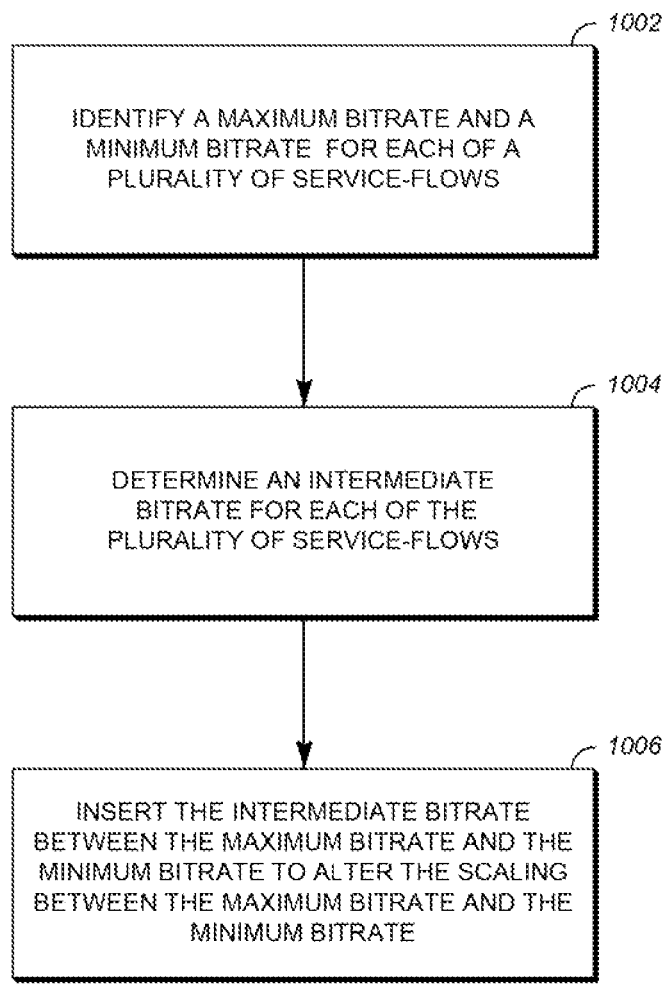
FIG. 10 depicts a flow diagram for a method for a non-linear reduction in bitrates for service-flows using shared Internet bandwidth as congestion increases.

FIG. 10 depicts a flow diagram for a method for a non-linear reduction in bitrates for service-flows using shared Internet bandwidth as congestion increases. At 1002, a processor such as a CMTS processor or the like may identify a maximum bitrate and a minimum bitrate for each of a plurality of service-flows. As described above, the maximum bitrate for a service flow may be defined as the maximum rate at which traffic can operate over this service flow, and may be expressed in bits per second. In DOCSIS applications, the maximum bitrate is the DOCSIS "Maximum Sustained Traffic Rate."

The minimum reserved rate may be a parameter that indicates a minimum guaranteed throughput in bits per second for the service flow. In DOCSIS applications, the minimum reserved rate is specifically defined as such. It is noted that the minimum reserved rate is typically zero for all services except VoIP, so it is typically zero for HSD (High Speed Data). However, the disclosed techniques also support a non-zero minimum reserved rate. As used herein, any references to minimum bitrate in the document is a reference to the minimum reserved rate or minimum rate, as these terms may be used interchangeably. Similarly, reference to the maximum rate or maximum bitrate are also used interchangeably and may be in reference to the DOCSIS-defined maximum bitrate, also referred to as the maximum sustained rate.

Both the minimum reserved rate and the maximum rate may be configurable per service flow. Typically, an operator would configure a list of parameters for each service class rather than for each modem individually and these would include the maximum rate and minimum rate parameters (but also other parameters like max traffic burst, traffic priority, classifiers etc). Therefore, an operator may support a limited number of different service classes, e.g., 10 different service classes, for millions of subscribers, e.g., for VoIP, for 200 Mbps HSD, for 100 Mbps HSD . . . for 10 Mbps HSD, etc. When an operator configures a service-flow, a particular service-class would be referenced and all service-flow parameters would be copied from that. Therefore, each service-flow could have unique parameters, or each service-flow may have the same parameters as all other service flows of the same class (but its own copy of them).

Embodiments are described herein for scaling back bitrate from a maximum rate to a minimum reserved rate in a non-linear fashion so that the high maximum rates can be made to drop off quickly during congestion.

At 1004, an intermediate bitrate for each of the plurality of service-flows may be determined. The intermediate bitrate may be determined so as to alter a linear scaling between the maximum bitrate to the minimum bitrate. In particular, the intermediate bitrate may be determined to cause, as congestion of the shared Internet bandwidth increases, a reduction in the bitrates for each service flow between the maximum bitrate and the intermediate bitrate that is greater than that of a linear reduction between the maximum and minimum bitrates. It is noted that in embodiments the intermediate rate may be configured to scale back the bit rate during periods of congestion in a manner that causes a greater scaling back or reduction in the bit rate than the linear scale back reduction Also, the intermediate bitrate may be determined to cause a greater reduction in bitrates servicing heavier users than a reduction in bitrates servicing comparatively lighter users. Heavier users have a higher average bitrate when measured over a configured interval compared to comparatively lighter users. FIG. 2 depicts an embodiment of the disclosed techniques that scales the bitrate towards an intermediate value first, which may improve the bandwidth distribution between service-flows containing a variety of configured maximum bitrates. As described herein, the bandwidth distribution occurs between service flows, which may adjust the bandwidth distribution within groups of service flows having the same configuration parameters.

As shown above with respect to FIG. 3, the initial slope as congestion increases is much steeper for Line A, causing the bit rate to drop much faster for service flows using Line A. In embodiments disclosed herein, heavier users instead have a steeper drop from the max bit rate towards intermediate than lighter users that have a slower drop in bitrate. For example, rather than scaling the bitrate linearly from the configured maximum bitrate towards zero in response to increasing congestion, the intermediate value is used to improve bandwidth distribution. Further, the calculations and updates made for a heavy user may be based on the heavy user's bandwidth utilization measured over a configured interval.

At 1006, the intermediate bitrate is inserted between the maximum bitrate and the minimum bitrate to alter the scaling between the maximum bitrate and the minimum bitrate, as shown in both FIGS. 2 and 4, for example. The altered scaling results in an increasing reduction in a ratio of the operative bitrates to respective maximum rates between service-flows as the congestion increases. The intermediate value technique may enable a light user access to bandwidth for bursting, potentially providing the light user with 100% of their desired usage.

We claim:

1. A method for a non-linear reduction in bitrates for service-flows using shared Internet bandwidth as congestion increases, the method comprising:
    identifying a maximum bitrate and a minimum reserved bitrate for each of a plurality of service-flows; and
    determining at least one intermediate bitrate for each of the plurality of service-flows to alter a linear scaling between the maximum bitrate to the minimum reserved bitrate, the at least one intermediate bitrate determined to cause, as congestion of the shared Internet bandwidth increases, both:
        a reduction in the bitrates for each service flow between the maximum bitrate and the intermediate bitrate that is greater than that of a linear reduction between the maximum and minimum reserved bitrates, and
        a greater reduction in bitrates servicing heavier users than a reduction in bitrates servicing comparatively lighter users,
    wherein inserting the at least one intermediate bitrate alters the scaling between the maximum bitrate and the minimum reserved bitrate to cause an increasing reduction in a ratio of operative bitrates to respective maximum rates between service-flows as the congestion increases.

2. The method of claim 1, wherein the bitrate of a service flow is scaled from a maximum rate to a minimum reserved rate in a non-linear fashion.

3. The method of claim 2, wherein the minimum reserved rate is zero.

4. The method of claim 1, wherein the at least one intermediate rate determined for a service-flow in the plurality of service flows having a respectively higher maximum rate prevents the service-flow from having a bitrate that is proportional to at least one of the service-flow's maximum rate or minimum reserved rate during a period of increased congestion.

5. The method of claim 1, wherein at least one of a maximum rate, a minimum reserved rate, or a priority of the plurality of service flows is maintained during the non-linear reduction in bitrates during periods of congestion.

6. The method of claim 1, further comprising dynamically calculating and updating an intermediate rate of heavy users as congestion increases.

7. The method of claim 1, wherein the at least one intermediate rate for a heavy user is calculated based on the heavy user's bandwidth utilization measured over a configured prior interval.

8. The method of claim 1, wherein a heavier user is a user with relatively more usage in a previous period of time of a defined duration than another user of the Internet bandwidth.

9. The method of claim 1, wherein usage is determined based on a usage in a prior period of time of a limited duration.

10. The method of claim 9, wherein a first service-flow, with a configured maximum bitrate that is greater than a configured maximum bitrate of a second service-flow, has a higher intermediate rate than an intermediate rate of the second service flow.

11. The method of claim 1, wherein the maximum rate and the minimum reserved bitrate is the same for two or more of the plurality of service-flows.

12. The method of claim 1, wherein the intermediate rate of service flow is inserted such that there is less difference in bitrates across service-flows as congestion increases.

13. The method of claim 1, wherein the intermediate bitrate is further determined to cause a reduction of the ratio of intermediate rate to maximum rate as a maximum rate of the plurality of service flows is increased.

14. The method of claim 1, wherein the intermediate bitrate is set to at least one of a discrete value determined based on service flow utilizations measured by a CMTS, or a value that varies from a maximum value towards a minimum value based on a measured utilization over a prior interval of a defined duration.

15. The method of claim 1, wherein the operative bitrates follow a curve between the maximum bitrate and the minimum reserved rate that is pushed lower than the linear scaling by the intermediate bitrate.

16. The method of claim 1, wherein the reduction in bitrates is a sharper reduction at the onset of a threshold level of congestion.

17. The method of claim 16, wherein the threshold level of congestion is determined based on a percentage of the available Internet bandwidth that is in use.

18. The method of claim 1, wherein the intermediate bitrate is varied to vary a penalization of bandwidth available to heavier users.

19. The method of claim 1, wherein a shape of the non-linear curve that connects the maximum bitrate to the intermediate bitrate to the minimum reserved bitrate can be controlled to have a steeper initial drop for heavy users.

20. The method of claim 1, further comprising imposing a requirement that all of the service-flows in the plurality of service-flows get their minimum reserved rate before any one service-flow gets more than their minimum reserved rate.

* * * * *